(No Model.)
C. MILLER.
GRAIN BINDER.
No. 323,353. Patented July 28, 1885.
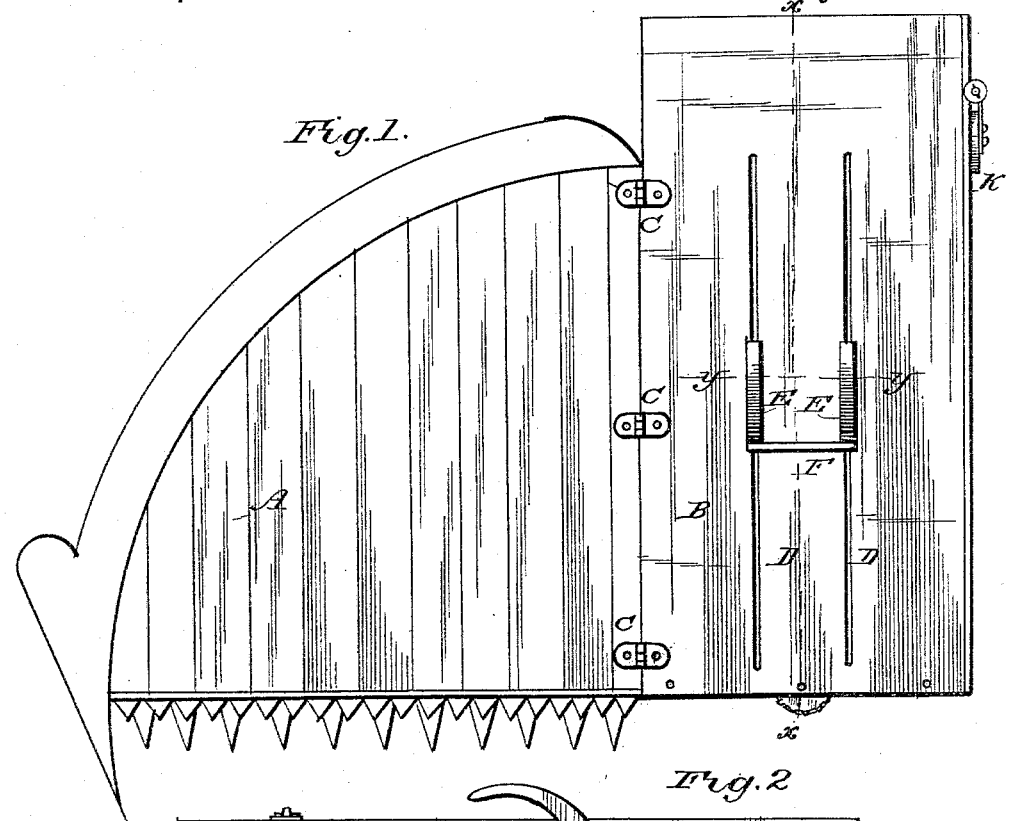
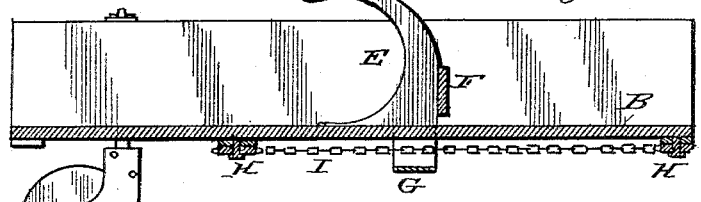
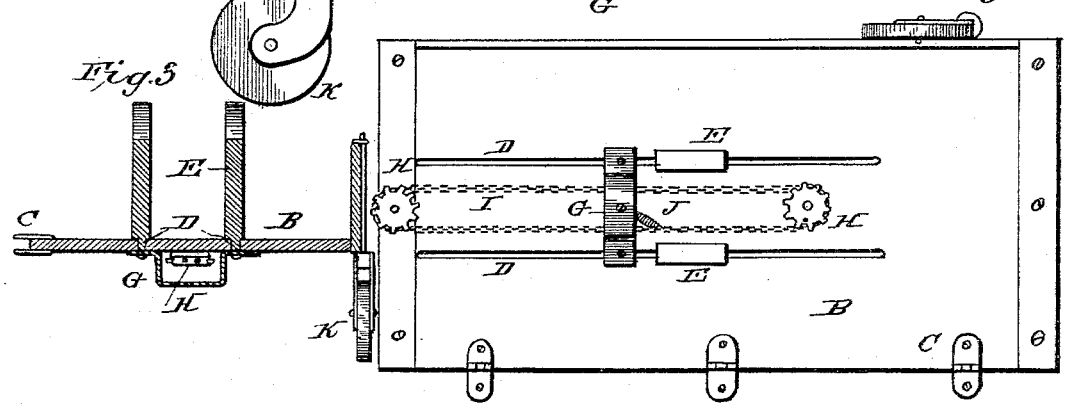
WITNESSES:
Fred. G. Dieterich.
Wm. Bagger
INVENTOR.
Charles Miller,
by Louis Bagger & Co.
ATTORNEYS

UNITED STATES PATENT OFFICE.

CHARLES MILLER, OF AUBURN, NEW YORK.

GRAIN-BINDER.

SPECIFICATION forming part of Letters Patent No. 323,353, dated July 28, 1885.

Application filed October 18, 1884. (No model.)

*To all whom it may concern:*

Be it known that I, CHARLES MILLER, of Auburn, in the county of Cayuga and State of New York, have invented certain new and useful Improvements in Grain-Binders; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of the grain-table of a harvester to which my improvement has been applied. Fig. 2 is a longitudinal sectional view taken on the line $x$ $x$ in Fig. 1. Fig. 3 is a transverse sectional view taken on the line $y$ $y$ in Fig. 1, and Fig. 4 is a bottom view.

The same letters refer to the same parts in all the figures.

This invention relates to grain-binding attachments for harvesters; and it has for its object to provide a device for forming and conveying the gavels to the binding-table which shall possess superior advantages in point of simplicity, ease of operation, and general efficiency.

With these ends in view the invention consists in the improved construction and arrangement of parts, which will be hereinafter fully described, and particularly pointed out in the claims.

In the drawings hereto annexed, A designates the platform of a harvester to which my improvement has been attached. B is a platform connected to the outer edge of the said main platform A by means of hinges C C, of any suitable construction. A rake of ordinary construction, or other suitable mechanism, is employed for the purpose of conveying the grain from the main to the auxiliary platform, from whence it is conveyed to the bundle-tying mechanism by the device, which I shall now proceed more fully to describe.

The platform B is provided with longitudinal slots D D, in which slide rakes E E, connected by a cross-piece, F, above the said platform, and by a bracket, G, under the same. Under the platform B, near the ends of the same, are journaled sprocket-wheels H H, over which runs a chain, I, which is connected with the bracket G of the rakes or carriers E E by a coiled or other spring, J, which admits of a certain flexibility of motion of the carriers E E, and at the same time permits the attaching-point of the said spring to pass the pivoting-points of the chain-wheels without regard to the relative lengths of the slots D and the chain I. It will be seen that by this mechanism an intermitting reciprocating motion is imparted to the carriers E E, which serve to convey the grain in gavels to the binding table or platform.

The auxiliary platform is supported on a caster-wheel, K, located at any desired point.

The platform B is detachably connected at its inner longitudinal side to the main frame of the harvester, so that when desired the said platform may be detached and removed from the harvester.

From the foregoing description, taken in connection with the drawings hereto annexed, the operation and advantages of this invention will be readily understood. It is simple in construction, effective in operation, and easily applied to harvesting-machines and reapers of ordinary construction.

Having thus described my invention, I claim and desire to secure by Letters Patent of the United States—

1. A grain-binding attachment for harvesters, comprising a table or platform having longitudinal slots, suitably-connected carriers or rakes sliding in the same, and an operating-chain connected by means of a suitable spring to the said carriers, substantially as and for the purpose set forth.

2. In a grain-binding attachment for harvesters, the combination, with a longitudinally-slotted table or platform, of a reciprocating carrier, a chain running upon sprocket-wheels journaled to the under side of the said table or platform, and a spring connecting the said chain with the said carrier, substantially as and for the purpose set forth.

3. The herein-described attachment for harvesters, comprising a table or platform having longitudinal slots and means for attaching it to the main platform of the machine, a reciprocating carrier, a chain running upon horizontal sprocket-wheels under the said platform, and a spring connecting the said chain with the said carrier, substantially as and for the purpose set forth.

4. An improved harvester attachment comprising a detachable platform, the outer rear corner of which is supported upon a caster-wheel, a carrier sliding in longitudinal slots in the said platform, an operating-chain, and a spring connecting the carriers with the said chain, substantially as and for the purpose set forth.

In testimony that I claim the foregoing as my own I have hereunto affixed my signature in presence of two witnesses.

CHARLES MILLER.

Witnesses:
JOHN C. WILSON,
HORACE T. COOK.